J. H. BRODIE.
Thill-Coupling.

No. 217,771.                 Patented July 22, 1879.

WITNESSES:
T. S. West
Cornelius Cox

INVENTOR:
J. H. BRODIE,
BY H. W. Beadle & Co.
ATTYS

UNITED STATES PATENT OFFICE.

JAMES HENRY BRODIE, OF RICHMOND, NEAR MELBOURNE, VICTORIA, AUSTRALIA.

IMPROVEMENT IN THILL-COUPLINGS.

Specification forming part of Letters Patent No. 217,771, dated July 22, 1879; application filed December 24, 1878.

*To all whom it may concern:*

Be it known that I, JAMES HENRY BRODIE, of Edinburgh street, Richmond, near Melbourne, in the British colony of Victoria, Australia, engineer, have invented new and useful Improvements in Contrivances for Connecting Shafts and Poles to Vehicles, which improvements are fully set forth in the following specification, reference being had to the accompanying drawings.

My improved contrivances for connecting shafts and poles to vehicles are safe, durable, easily adjustable and removable, and noiseless in working.

Figure 1:
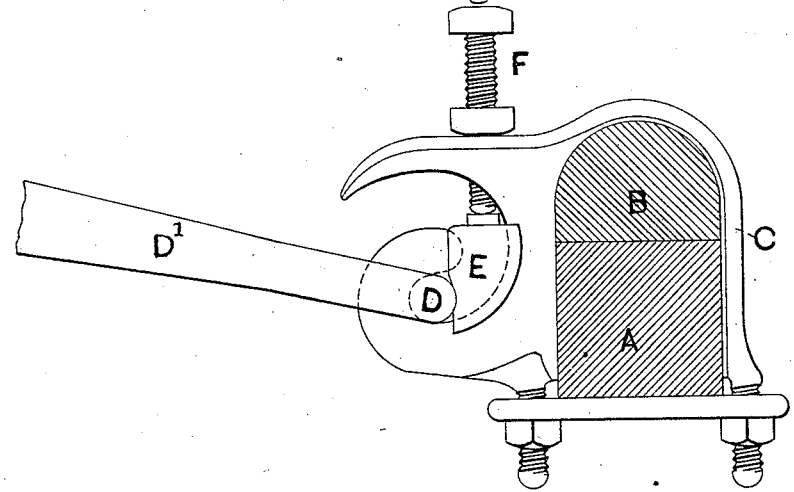
Figure 2:
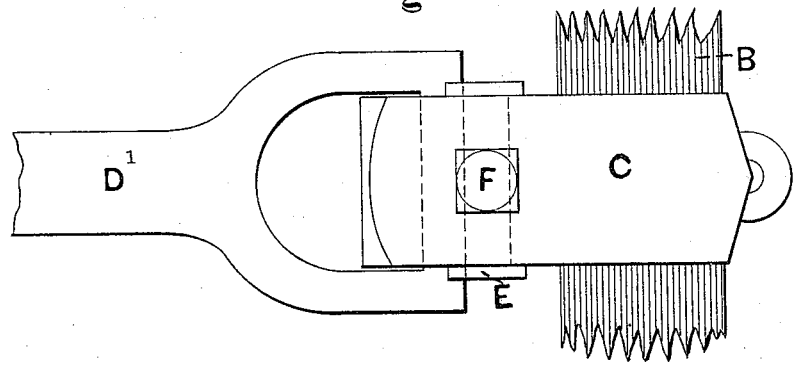
Figure 3:
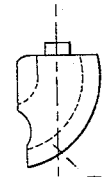
Figure 5:
Figure 4:
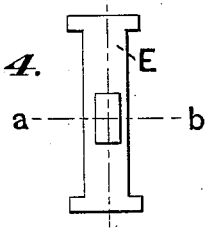

In my drawings, Figure 1 shows a side view of my contrivances connecting a shaft or pole to a vehicle, and Fig. 2 a top view. Fig. 3 shows an end view of cap-piece; Fig. 4, a top view, and Fig. 5 a section on the line $a\,b$ in Fig. 4.

A, Fig. 1, is the iron axle; B, Figs. 1 and 2, the wooden framing which rests on it; C, Figs. 1 and 2, the iron clip, which is made as shown in Fig. 1. D, Fig. 1, is the draw-pin on the end of the iron strap D', Fig. 1 and 2, which forms the termination of the shaft or pole. E in all the figures is a cap-piece, and F, Figs. 1 and 2, is a set-screw. The set-screw F presses on the cap-piece E, and so prevents any rattling of the draw-pin, and it can be screwed up as tight as may be required. By simply unscrewing the set-screw the cap-piece may be lifted out and the shaft or pole disconnected.

I claim—

In combination with the clip C, having the overhanging arm for supporting the set-screw, and the hook for receiving the shaft-bar D, the quadrant-shaped cap-piece E and set-screw F, arranged as and for the purpose described.

J. H. BRODIE.

Witnesses:
   EDWD. WATERS,
   W. S. BAYSTON.